J. MASSOLLE
ELECTROSTATIC TELEPHONIC INSTRUMENT FOR TRANSMITTING OR RECEIVING PURPOSES
April 2, 1929. Original Filed Aug. 3, 1925 Re. 17,256
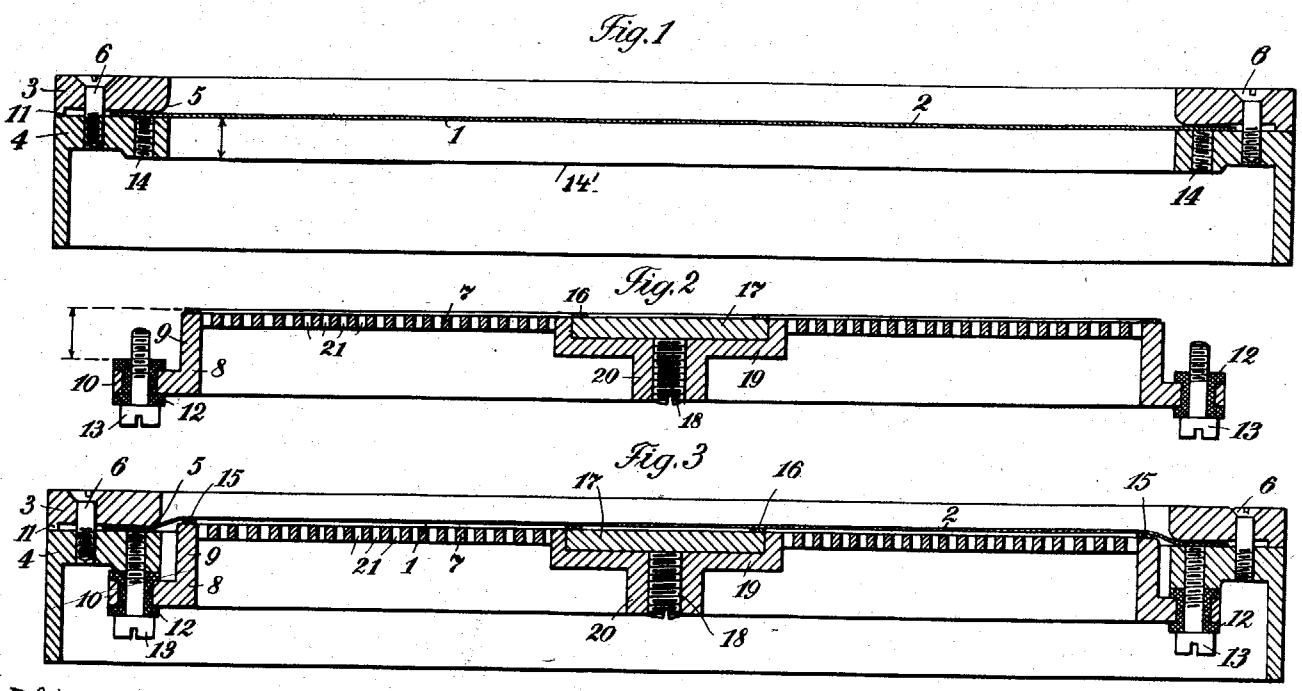
Inventor
Joseph Massolle
by
Ward Crosby and Smith,
His attorneys.

Reissued Apr. 2, 1929. Re. 17,256

UNITED STATES PATENT OFFICE.

JOSEPH MASSOLLE, OF BERLIN-WILMERSDORF, GERMANY, ASSIGNOR TO TRI-ERGON A. G., OF ZURICH, SWITZERLAND, A CORPORATION OF SWITZERLAND.

ELECTROSTATIC TELEPHONIC INSTRUMENT FOR TRANSMITTING OR RECEIVING PURPOSES.

Original No. 1,609,760, dated December 7, 1926, Serial No. 47,662, filed August 3, 1925, and in Germany July 9, 1925. Application for reissue filed February 20, 1929. Serial No. 341,547.

This invention relates to improved electrostatic telephonic instruments for transmitting or receiving purposes and more particularly or preferably to a so-called loud-speaking receiver.

It is a known fact that a perfectly true sound reproduction free from disturbing resonance notes and distortions or deformations cannot be obtained in a satisfactory manner except by means of apparatus which work on the electrostatic principle. In contradistinction thereto all of the apparatus which at present are usually practised and in which the alternating currents are transformed into sound waves according to the electromagnetic principle, are very objectionable.

The reason of the superiority of the apparatus working on the electrostatic principle resides in that heavy and strong iron diaphragms need not be employed therein and, as contrasted with magnetic loud-speaking receivers, funnel-shaped amplifying horns are not required in order to ensure a coupling with a quantity of air sufficient to realize a loud sound reproduction. For electrostatic loud-speaking receivers of the kind, as is well known in the art, allow of employing or applying larger diaphragm surfaces so that such surfaces are sufficiently coupled with the air.

An object of this invention is to improve the electrostatic instruments for transmitting or receiving purposes, particularly loud-speaking receivers having tightly stretched diaphragms, as hitherto constructed, by stretching the latter into their efficient position and holding the same in such position by means of the capacity body, or in other words, by positively forcing the capacity body mounted on the diaphragm holder, toward the diaphragm and securing the body in the holder with the diaphragm in properly stretched position. Other objects of the invention consist in the provision of improved forms of construction and combinations of elements, all as will more fully appear in the following specification.

An electrostatic instrument constructed according to the present invention, therefore, mainly comprises a rigid capacity body, a very thin diaphragm or film in front of the former and a short distance apart therefrom only, and a diaphragm holder, the two faces of the diaphragm or film being absolutely plane and parallel to each other and one face being coated with an electric conductor as usually.

In practically using an electrostatic instrument especially loud-speaking receiver of the improved construction the alternating voltages lie between the electric conductor or coating of the diaphragm and the capacity body. The variation of voltage results in a variation of the electrostatic forces of attraction between diaphragm and capacity body. The diaphragm vibrates according to the rhythm of the alternating voltages and produces in this way corresponding sound waves.

According to the present invention the diaphragm preferably consists of an extremely thin mica film with a metallic coating thereon and the holder preferably consists of two rings adapted to be firmly connected to each other with the diaphragm interposed therebetween so as to be perfectly plane. The two rings constituting the diaphragm holder are connected with each other by means of screws or the like and they are shaped—in section—in a manner that, upon tightening the screws, the diaphragm peripherally interposed between the two halves of the holder, will receive a preliminary stretching in radial respects so that the same will be perfectly flat and plane.

The thus obtained preliminary stretching of the diaphragm is efficiently completed preferably in the following way. The rigid capacity body is provided with a contacting member or surface co-operating with the film or diaphragm and situated sufficiently remote from or above the active surface of the capacity body to cause the diaphragm, upon tightening the screws provided for connecting the capacity body to the holder to be displaced from its previous flat condition or plane without changing or interfering with the requisite distance between the inner face of the diaphragm and the opposed face of the capacity body or with the parallelism of the active surface of the latter and the diaphragm. In other words, by connecting the improved capacity body with the bipartite holder by means of screws a means will be afforded for giving the diaphragm the requisite stretching and tension by displacing the same with respect to the holder but without displacing the same with relation to the capacity body.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the accompanying drawings forming a part of this specification a single example or embodiment of the invention is exhibited, Figure 1 being a view in axial or central section of the diaphragm holder with the diaphragm clamped, between the two parts thereof, in its preliminary stretched position; Figure 2 being a similar sectional view of the capacity body; and Figure 3 showing the two components illustrated in Figures 1 and 2, duly assembled and with the diaphragm in fully tensioned condition.

Referring to Figure 1 the thin mica film 1 is provided on its outer face with an electrically conducting, preferably metallic coating 2 and the periphery of the diaphragm is clamped between the two rings 3 and 4 which constitute the holder, these rings being of like dimensions in diametrical respects. The inner edge 5 of the inner periphery of the ring 3 is rounded, whilst the inner edge of the outer periphery of the ring 3 is shaped to form an annular flange 11. The two rings 3 and 4 are to be connected with each other, in superposed relation and with the peripheral portion of the diaphragm 1 therebetween, by means of screws 6. By tightening the latter the two rings will approach each other and, owing to the particular shape of the ring 3 and the springiness ensured by such shape, the diaphragm 1 will be radially drawn outwards and thereby receive a preliminary stretching to form an accurately plane surface as shown in Figure 1.

The circular or disk-shaped capacity body comprises a central portion 19, a peripheral or rim portion 8 and an intermediate portion 7 which is thoroughly plane on both sides and of even thickness throughout. The three portions constituting the capacity body are preferably made in one piece so as to be integral with each other. The rim 8 comprises a main portion 9 which is of the same thickness, in axial regards, as the central portion 19, and an annular flange 10 projecting from the portion 9 outwards or in radial directions so that the two parts 9 and 10 are perpendicular to each other. The annular flange 10 is provided with a number of holes and insulating bushes 12 of non-conducting material are inserted into the holes for the reception of screws 13.

The ring 4 of the diaphragm holder is provided with screw-threaded holes or openings 14 corresponding in number and location to the holes in the flange 10 of the capacity body, so that the latter can be firmly connected with the holder by means of the screws 13 passing through the bushings 12 and into the threaded holes 14 of the holder, as will be clearly understood on inspection of Figure 3.

The central portion 19 of the capacity body is cup-shaped to accommodate an annular disk 17 filling the cup to the level of the intermediate portion 7 of the body, and the bottom of the cup is enlarged to form a boss 20 with a central threaded bore for the reception of a short spindle or screw 18 the purpose of which will be explained further below.

On the top of the described capacity body two flat rings 15 and 16 made of a non-conducting material such as paper or the like, are placed, the larger ring 15 being supported by the portion 9 of the rim 8 and the narrower ring 16 being supported by the disk 17 which fits loosely in the cup or cavity of the central portion 19 of the capacity body.

The dimensions of the ring 4 of the holder and of the portion 9 of the rim 8 of the capacity body are selected to render the distance *a*, Figure 1, between the lower or inner surface of the mica diaphragm and the edge 14′ of the ring 4 somewhat less than the distance *b*, Figure 2, between the top of the bushes 12 and the plane of or coinciding with the upper faces of the paper or other insulating rings 15 and 16, so that upon assembling and connecting together the holder and the capacity body by means of the screws 13 the insulating rings 15 and 16 will displace and lift the mica diaphragm out of its position, shown in Figure 1, into a parallel plane, as shown in Figure 3. In this way the requisite tension of the diaphragm is brought about and the paper rings 15 and 16 act to prevent the properly stretched and tensioned diaphragm from contacting with the intermediate portion 7 of the capacity body, when caused to vibrate. The extent to which the diaphragm 1 is removed or lifted from the plane position shown in Fig. 1 to the elevated position illustrated in Figure 3, that is, the stretching or final tension of the diaphragm, therefore, is determined by the difference between the dimensional values *a* and *b*, Figures 1 and 2.

For the purpose of adjusting the diaphragm 1 with relation to the opposed surface of the capacity body I provide the disk 17 fitting loosely in the cup or cavity of the central portion 19 of the capacity body, and the spindle or screw 18, as hereinbefore described. By means of the spindle or screw 18 and disk 17 can be raised above the level or plane of the intermediate portion 7 of the capacity body whereby the paper ring 16 will be lifted out of the plane of the paper ring 15 and the diaphragm 1 correspondingly spaced apart from the capacity body to the desired or required extent.

In order to maintain the tension of the diaphragm, obtained in the manner hereinbefore described, constant for any length of time, it is advisable to use a material for making the two clamping rings 3 and 4, which possesses the very same coefficient of expansion as the material of which the diaphragm is made or consists. Thus if the diaphragm consists of mica, clamping rings 3 and 4 made of suitable cast iron will give satisfactory results on the line above indicated, it being possible to reduce, by selecting a cast iron of the required properties, the difference between the coefficients of expansion of the two materials, viz, mica and cast iron, so far as to realize and ensure a tension in the diaphragm which is practically constant or independent of variations of temperature.

The intermediate portion 7 of the capacity body may be provided with perforations 21 preferably arranged symmetrically all over the annular portion 7, for the purpose of reducing the damping in the narrow space between the diaphagm and the capacity body.

What I claim is:—

1. In an electrostatic telephone, the combination of a diphragm holder, a diaphragm, means for securing said diaphragm in said holder, a rigid plate constituting a capacity body and means for securing said plate to said holder, after said diaphragm is secured in said holder, in such position that said plate will exert pressure against said diaphragm, within said holder, to stretch the diaphragm.

2. In an electrostatic telephone, the combination of a diaphragm holder, a diaphragm, means for securing said diaphragm in said holder, a rigid plate constituting a capacity body having a pressure device associated therewith, and means for securing said plate rigidly to said holder, after said diaphragm is secured in said holder, in such position that said pressure device will bear against said diaphragm, within said holder, to displace it from the plane occupied thereby previous to the securing of said plate in position, to stretch the diaphragm.

3. In an electrostatic telephone, the combination of a pair of rings constituting a diaphragm holder, a diaphragm, means for securing the same between said rings, a rigid plate constituting a capacity body, carrying a pressure device, and having an offset outer flange, and means for securing said flange against one of said rings, after said diaphragm has been secured in said holder, with said pressure device bearing against said diaphragm, within said holder, to stretch said diaphragm.

4. In an electrostatic telephone, the combination of a pair of rings constituting a diaphragm holder, a diaphragm, secured between said rings, a rigid plate constituting a capacity body, having a forward face and a rearwardly extending marginal flange with an outwardly extending offset portion, spacing means to be positioned between said forward face and said diaphragm, and means for securing said flange offset portion against one of said rings with said spacing means bearing against said diaphragm to stretch the same.

5. In an electrostatic telephone, the combination of one unit comprising a diaphragm and rigid ring secured to the edge thereof, a second unit comprising a rigid condenser plate and seating means therefor extending radially outwards to the rear of said plate, and rigidly connected thereto, and means for securing said seating means against said ring with said plate exerting pressure against said diaphragm within said ring to stretch the same.

6. In an electrostatic telephone, the combination of a unit comprising a diaphragm and rigid ring secured to the edege thereof, a rigid condenser plate, seating means therefor rigidly connected thereto and extending radially outwards to the rear thereof, spacing means on the edge and center of said plate, and means for securing said seating means against said ring with said plate extending within said ring and said spacing means exerting pressure against said diaphragm to stretch the same.

7. In an electrostatic telephone, the combination of a holder, a diaphragm having its edge secured thereto, a rigid condenser plate, seating means therefor rigidly connected thereto and extending radially outwards to the rear thereof, spacing means extending through said plate and adapted to be positioned at an adjusted distance beyond the face of said plate, and means for securing said seating means against said holder with said plate extending within said holder and exerting pressure against said diaphragm to stretch the same.

8. In an electrostatic telephone, the combination of a holder comprising a pair of rings, and a diaphragm secured at its edge between the same, said rings being arranged to place said diaphragm under preliminary tension, a rigid condenser plate, rearwardly spaced marginal seating means therefor, and means for securing said seating means against one of said rings with said plate exerting pressure against said diaphragm to place the same under tension greater than said preliminary tension.

9. In an electrostatic telephone, the combination of a diaphragm holder, a diaphragm, means for securing said diaphragm in said holder, a rigid plate constituting a capacity body and means for securing said plate to said holder, in such position that said plate will exert pressure against said diaphragm, to stretch the diaphragm as secured within said holder.

10. An electrostatic telephone, comprising a diaphragm, a rigid condenser plate member, and means at the periphery of said rigid plate member for peripherally securing the diaphragm in respect thereto with portions at the face of said rigid plate member exerting pressure against the diaphragm within said diaphragm securing means for displacing the entire effective vibratory area of the diaphragm from the plane of its secured periphery, to stretch the diaphragm over the face of said rigid plate.

11. In an electrostatic telephone, the combination of a diaphragm holder, a diaphragm, means for securing said diaphragm in said holder, a rigid plate constituting a capacity body and means for securing said plate to said holder, in such position that said plate will exert pressure against said diaphragm along predetermined lines only, to maintain the diaphragm stretched as secured within said holder, said rigid plate having perforated capacity areas between said lines.

12. An electrostatic telephone, comprising a diaphragm, a rigid condenser plate member, and means at the periphery of said rigid plate member for securing edges of the diaphragm in respect thereto with portions at the face of said rigid plate member exerting pressure along predetermined lines against the diaphragm as mounted in said diaphragm securing means, for displacing the effective vibratory areas of the diaphragm from the plane of its said secured edges, to maintain the diaphragm stretched over the face of said rigid plate, said rigid plate having perforated capacity areas between said predetermined lines.

In testimony whereof, I have signed my name to this petition.

JOSEPH MASSOLLE.